Dec. 8, 1942.    C. T. McGILL    2,304,109
FLUID CONDITIONING SYSTEM
Filed May 20, 1939    2 Sheets-Sheet 1

INVENTOR.
Chester T. McGill
BY
Wilkinson Huxley Byron & Knight
ATTORNEYS.

Dec. 8, 1942.  C. T. McGILL  2,304,109

FLUID CONDITIONING SYSTEM

Filed May 20, 1939  2 Sheets-Sheet 2

INVENTOR
Chester T. McGill,
BY
Wilkinson Huxley Byron & Knight
ATTORNEYS.

Patented Dec. 8, 1942

2,304,109

UNITED STATES PATENT OFFICE 2,304,109

FLUID CONDITIONING SYSTEM

Chester T. McGill, Elgin, Ill., assignor to Elgin Softener Corporation, Elgin, Ill., a corporation of Illinois Application May 20, 1939, Serial No. 274,705

18 Claims. (Cl. 210—24)

The present invention relates to fluid conditioning apparatuses, and more in particular to fluid control devices therefor.

One object of the present invention is to provide a novel device adapted to be used in conjunction with fluid conditioning apparatus to improve the efficiency of operation of the latter in its various cycles of operation.

Basically, fluid conditioning apparatuses of the type herein disclosed are well known, the same operating on the principle of introducing fluid to a contained bed of fluid conditioning material in one direction of flow to improve the characteristics thereof as by means of mechanical or chemical treatment to condition the same for use. These apparatuses operate on the principle of directing flow of fluid to be treated for a period of time in one direction until the rate of flow is such as to indicate the necessity for some form of cleaning and/or regenerating process. Such cleaning or rehabilitation of the bed is accomplished by reversing the flow of fluid through the bed to revivify the same, causing a rearrangement and loosening of the comminuted particles of the conditioning material and to segregate and carry off the accumulations of foreign material intermingled therewith and which are the primary cause of said decrease in flow.

In these apparatuses of conventional design, the tank or container would permit of the use of conditioning material to the full capacity thereof insofar as the procedure involving the conditioning of fluid is concerned. However, this ideal situation has never been attained inasmuch as the cleaning and rehabilitating procedure involves the necessity of vigorously forcing fluid in the reverse direction through the bed of conditioning material to dislodge accumulations of foreign substances and materials from the comminuted particles thereof and to discharge the same from the tank, which causes expansion of the said bed, thus leading to loss of said conditioning material to the drain under the action of this fluid flow.

Because of these difficulties, former installations have required the provision of an ample free board space at the upper regions of the tank to accommodate the expansion of the said bed of conditioning material to prevent overflow of the material into the drain, or as a second alternative, where compromise has been dictated as to free board space, conditioning material of greater size has been used, or the rates of flow through the tank have been decreased, or the installation has involved an assembly combining in its arrangement provision for modification of all of these factors in varying degrees to accommodate the requirements of the particular unit. Instrumental in decreasing the efficiency of one of these apparatuses is the decrease in rate of flow therethrough, which results in ineffective rehabilitation of the bed, and where larger particles for the conditioning material have been required the efficiency has been further decreased inasmuch as finer particles of conditioning material are much more effective in their fluid conditioning properties because of greater surface areas per unit volume of the same.

Of late certain improvements have been developed in flow control devices for such fluid conditioning apparatuses to improve the operating characteristics of the same and to eliminate certain of the difficulties before experienced. Such devices have taken the form of fluid control mechanisms located in association with the free board space at the upper region of the tank above the level of the bed of conditioning material. To facilitate the cleaning of the said bed during the "off" cycle of operation, these devices embody in their construction fluid outlet means at different levels in the said tank, one of which is located in association with the upper portion of the bed of conditioning material such that flow through the said material can be maintained at high rates to the level of the said fluid outlet means which operates to gradually decrease the flow rate from or adjacent the upper portion of the bed to the level of the other of said fluid outlet means which accommodates this decreased flow of fluid at this level.

This arrangement permits greatly increased flow rates through the bed of said conditioning material to dislodge and discharge sediment and other foreign material accumulated therein, yet providing for installations wherein the required free board space can be greatly and materially reduced. As a satisfactory fluid discharge and outlet device for use at the lower level at or in association with the free board space, it has been found that an elongated strainer with apertures spaced at intervals serves to permit gradual decrease in flow rates without loss of fluid conditioning material inasmuch as the said fluid outlet means is so constructed as to permit flow of fluid with suspended particles of foreign substance therein, yet small enough to retain the smallest particles of the said conditioning material. Fluid flow at decreased rates at the upper level of the said fluid control mechanism is accommodated by fluid outlet means providing for the discharge of fluid together with suspended material in the form of foreign particles from the tank to the drain. These improved constructions, although far superior in their operation to conventional means for accommodating this cleaning process in apparatuses of the type herein under consideration, nevertheless are subject to certain criticisms in that reverse flow of fluid through the tank on the "on" cycle of operation is accommodated in part by both fluid discharge means at different levels, which results gradually in the accumulation of sediment and foreign substances within the flow discharge means or strainer at the lower level, the accumulations of sediment and foreign material filling the said openings thereof and not only decreasing the flow of fluid therethrough during the "on" cycle of operation but completely or partially blocking and preventing flow of fluid therethrough during the "off" cycle of operation or during the cleaning procedure. This complete or partial stoppage of flow of fluid at or adjacent the top of the conditioning material during the cleaning process prevents decrease in flow rates from the lower portions of the free board space upwardly to the second fluid discharge means, thus the increased rates of flow through the conditioning material are maintained in the free board space to or approaching the level of the second fluid discharge means. Such increased rates of flow, if maintained throughout the tank to or approaching the level of the upper discharge means, may result in the loss of considerable amounts of conditioning material therethrough and into the drain. Then again, the said fluid control devices are subject to criticism on the score that the said fluid discharge means at the upper level is unrestricted, thus facilitating discharge of conditioning material therethrough after gradual stoppage of the fluid discharge means at the lower level, the said uncontrolled flow of fluid through the former being instrumental in creating channeling or blowing of the bed, thus leading to varying flow rates throughout the said bed where a number of the said devices are used in the tank.

The present invention is grounded upon the theory of providing a flow control device in association with the free board space of an apparatus as typified herein which permits maximum desired and substantially uniform rates of fluid flow throughout the bed of fluid conditioning material, yet providing for the complete removal of sediment and foreign material laden fluid from the tank during the cleaning and rehabilitating process. Furthermore, the invention comprehends constructions for the said fluid control devices wherein gradual accumulation of sediment is prevented in those parts of the devices which are instrumental in providing for increased flow rates without loss of conditioning material during the cleaning operation with decreased free board space requirements, yet which will provide for the proper discharge of fluid into the tank during the normal "on" cycle of operation.

A further object of the present invention is to provide novel flow control devices adapted for use with fluid conditioning apparatuses which are so constructed and arranged as to control flow of fluid into and out of said apparatuses, said control being such as to properly proportion and regulate the flow rates through the fluid conditioning material, and particularly during the cleaning or rehabilitation of the same.

The present invention also comprehends novel devices adapted for use in conjunction with fluid conditioning apparatuses which in their design embody features for control of the flow rates at various parts of the said apparatuses whereby the fluid conditioning material is effectively reconditioned without loss, and the sediment and other foreign substances are effectively removed therefrom.

As a further object, the present invention contemplates devices for use in fluid conditioning apparatuses which are so constructed and designed as to be adapted to a plurality of installations which may be embodied in various fluid conditioning apparatuses.

As a further desideratum of the present invention, the fluid control devices herein contemplated involve designs particularly adapted for the use to which the same are put, avoiding pockets, recesses, etc. in their construction to prevent accumulations of foreign substances and matter which would otherwise decrease their effective flow capacity and contaminate the fluid being treated in the apparatuses with which the same are used.

As one of the principal objects of the present invention, the devices herein described embody as principal features of construction flow control means automatically regulated by fluid flow in the apparatuses with which the same are associated wherein the said flow control means effectively provides for uniform reconditioning or rehabilitation of the fluid conditioning material of the said apparatuses more uniformly throughout their entire body without decrease in the flow rate or loss of said material, yet providing for effective disposal or rejection of the sediment and suspended matter intermingled therewith without causing uneven packing, channeling or blowing of the bed of fluid conditioning material which would otherwise render the devices substantially inoperative or at least inefficient during flow of fluid in the reverse direction during the fluid conditioning cycle.

In their more specific forms, the devices falling within the scope of the present invention include certain valve mechanisms operatively associated with a strainer wherein flow in one direction is relatively unrestricted and flow in the other direction is relatively restricted, the said relatively restricted flow in the other of said directions being at different levels in the apparatus with which the same are associated.

More particularly, the devices herein contemplated take various forms in their specific adaptations of the principles involved in that the same may be separable in their construction to adapt the flow control means for installations of various kinds, yet in their assembled relation with said installations embody the herein enumerated principles of operation including relatively unrestricted flow in one direction and relatively restricted flow at different levels or elevations in the other direction of operation of the fluid conditioning apparatuses with which the same are associated.

Other objects, features, capabilities and advantages are comprehended by the invention, as will later appear and as are inherently possessed thereby.

Referring to the drawings.

Figure 1:
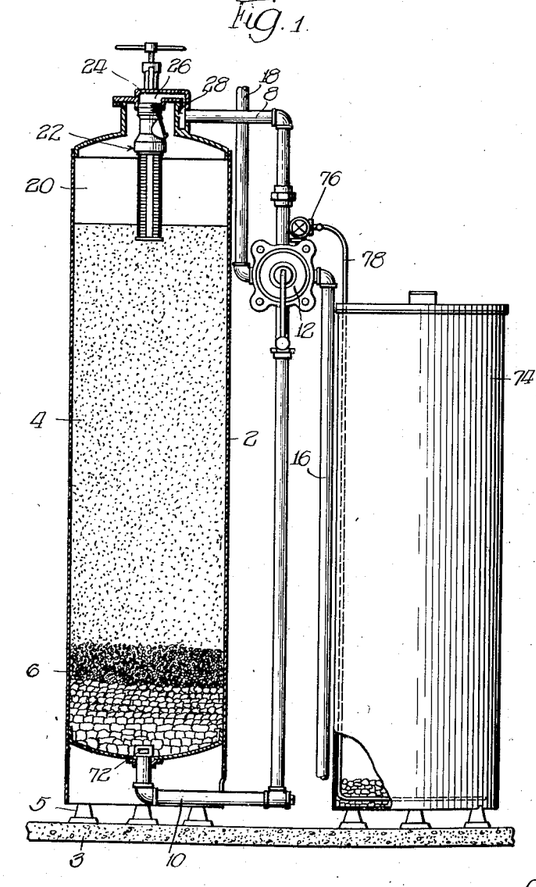
Figure 1 is a view partly in cross section and partly in elevation of a fluid conditioning apparatus embodying the present invention.
Figure 2:
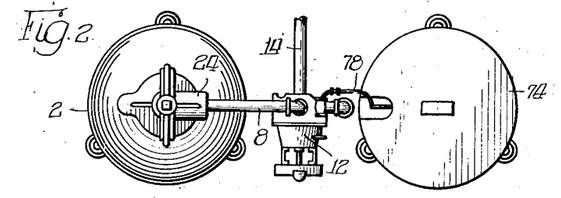
Figure 2 is a top plan view of the apparatus shown in Figure 1 of the drawings.

Referring now more in detail to the drawings, a fluid conditioning apparatus embodying in its construction novel fluid control means made in accordance with the present invention is disclosed in Figures 1 and 2 as comprising a tank 2 mounted upon a suitable foundation 3 by way of pedestals 5 and having a confined bed 4 of fluid conditioning material therein which rests upon a graded bed 6 of gravel. The apparatus comprises means for providing two-directional flow of fluid into and out of said tank including fluid duct 8 at the top of the tank and a fluid duct 10 adjacent the lower part of the tank, both of which communicate with a multi-port valve mechanism, generally referred to as 12, for controlling the flow of fluid through said conduits 8 and 10. Intercommunicating with valve mechanism 12 is a raw fluid duct 14 and drain 16, as well as a duct 18, for supplying conditioned fluid to a point remote from the apparatus. This multi-port valve mechanism is so constructed and arranged as to effect varying fluid circuits during operation of the apparatus, as will be hereinafter more fully described.

Although the apparatus of Figures 1 and 2 embodies in its construction features which adapt the same for conditioning fluids generally, the specific embodiment embraces structure particularly adapted for conditioning water and accordingly shall be hereinatfer referred to in conjunction with such use. In the form disclosed, the bed of material is constituted by a body of comminuted particles of water conditioning material resting upon gravel bed 6 which serves to condition the water passing through the tank from a raw water source and which is delivered to a point of use usually remote from the tank in treated condition.

The tank 2 adjacent its upper end is provided with a free board space 20 above the bed 4, in association with which is a fluid control device 22 secured to a cap or closure 24 formed with a duct 26 in communication with a duct or chamber 28 formed in the tank 2 adjacent its head which leads to the duct or conduit 8.

Figure 3:
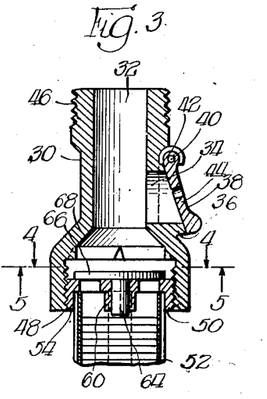
Figure 3 is a cross sectional view of a fluid control device used in conjunction with the apparatus as shown in Figure 1 of the drawings.
Figure 4:
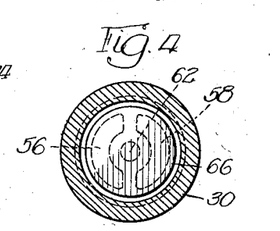
Figure 4 is a view in cross section taken in the plane represented by line 4—4 of Figure 3 of the drawings.
Figure 5:
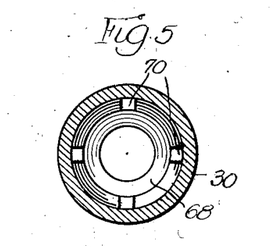
Figure 5 is a view in cross section taken in the plane represented by line 5—5 of Figure 3 of the drawings.

The fluid control device of this embodiment is shown somewhat more in detail in Figures 3 to 5 inclusive, and comprises a body 30 having an internal passage 32 extending longitudinally thereof and which, intermediate the ends thereof, communicates with a port 34 defined by wall 36 providing a seat in a plane angularly disposed with respect to the longitudinal axis of the device. Valve member 38, which is swingably mounted as at 40 to spaced hinge lugs 42, is adapted to seat with wall 36 to provide a closure for port 34 and is provided with an aperture 44 which, when the valve member 38 is in closed position, effects communication between the internal passageway 32, port 34 and the free board space 20 adjacent the top of the tank. The body member 30, in the illustrative embodiment, is provided with threads 46 adjacent one end thereof adapted to threadedly engage the closure 24 whereby the same is supported by said closure in depending relation thereto in the free board space 20 whereby passageway 32 intercommunicates with ducts 26 and 28.

Adjacent the other end of the body member 30, the passageway 32 is flared and threaded as at 48 to receive a fitting 50 having recess 54 therein in which is secured a strainer 52 in any desired manner. This fitting 50 constitutes a valve seat having the ports or apertures 56 and 58 formed therein defined in part by the spider 60 which is apertured as at 62 to receive the stem 64 of a valve 66 in the form of a plate or a disc attached to the stem and adapted in one of its positions to overlap or overlie the ports or apertures 56 and 58. In opposed relation to valve member 66 and at the transitional surface 68 between the small and enlarged parts of passage 32 are a plurality of shoulders or lugs 70 disposed to engage the valve member 66 to limit its longitudinal movement in said passage 32 and in respect of said apertures or ports 56 and 58. Valve openings 56 and 58 effect communication between passageway 32 and the interior chamber of strainer 52 for the passage of fluid when valve member 66 is raised from its seat 50. The strainer operates in conjunction with the mechanism herein described to perform certain functions as hereinafter more fully disclosed, and embodies in its formation a plurality of fine slits large enough only to allow passage of finer particles of sediment with the flow of water, but small enough to retain even the finer particles of fluid conditioning material of bed 4 within the tank, thus providing for relatively restricted flow during a certain cycle of operation, as will be hereinafter more fully described.

Although relatively restricted flow of fluid is accommodated by the aperture 44, as will later appear, it is to be understood that such flow may be effected by an aperture or opening in the body 30 above valve 66 or by such an opening in combination with an opening in the valve member 38.

The apparatus herein described has been referred to as including a graded bed of gravel 6, but it is to be understood that the apparatus may be assembled to embody the construction herein described or may incorporate a body of conditioning material extending to the bottom thereof without making use of the graded gravel bed whatsoever.

Furthermore, in the present embodiment, conduit 10 is disclosed in communication with a nozzle 72 disposed adjacent the bottom of the tank and surrounded by the gravel bed 6 for two-directional flow of fluid through pipe 10 into and out of the tank, although it is to be understood that where conditions warrant and it is so desired, the fluid distributing and receiving means at or adjacent this level in the tank, or at any other desired level, may consist of a manifold of any suitable construction embodying lateral ducts to both or any one of which nozzles or other fluid receiving or distributing means may be attached.

As a procedural step in the operation of the apparatus as above described, when used as a water treating device it becomes necessary to regenerate the conditioning material 4 from time to time by the introduction of a regenerating solution. In the present embodiment, a regenerating agent in the form of a solution is retained in tank 74 and is injected into the system by way of an injector device disposed within valve 12 and controlled by valve 76, the same having a conduit 78 leading to a point adjacent the bottom of the tank 74 and which supplies said regenerating solution under pressure to the water circuit introducing water into tank 2.

Under normal operating conditions involving the continual flow of water through the system, raw water is introduced into the tank from the main 14 through the multi-port valve 12 to the conduit 8 and thence into ducts 26 and 28 to the passageway 32 of the fluid control device 22. This water under pressure flows through the port 34, lifting valve 38, and thence into the free board space 20 downwardly through the water conditioning material 4 to treat the raw water, after which the flow is through pipe 10 to multi-port valve 12 to duct 18, where the same is carried to a point of use. In following this flow of water through the device, it is to be understood that during this cycle of operation, multi-port valve 12 is manipulated to effect communication between the various conduits and ducts as described. Furthermore, it should be noted that during this direction of flow of fluid, the flow is entirely through the port 34 into the tank adjacent the top of the free board space 20 inasmuch as the valve 66 is in seating relation with valve seat 50.

As is well understood, water treated in the manner above described gradually causes a decrease in the effectiveness of the water conditioning material 4. Furthermore, foreign substances such as suspended matter, sediment and the like, contained in the said raw water, are filtered out in bed 4, thus causing accumulations of particles which become matted and compressed within the interstices of the said bed to such an extent that flow of water through the tank is greatly restricted, thus gradually decreasing its efficiency to such an extent that it becomes necessary to recondition, rejuvenate or rehabilitate the conditioning material 4 to return the same to its original effective condition for the water treating process.

In order to effect this procedure, the flow of fluid through the tank 2 is reversed by means of manipulating multiport valve 12 to discharge water from duct 14 into conduit 10, thus providing for an upflow of water through the bed of material 4 which loosens the said bed and causes a discharge or removal of the fine sediment or other foreign materials which have lodged within the interstices between the comminuted particles of conditioning material of the said bed. The flow of water with suspended and foreign material is rather largely accommodated by the strainer 52, the said water flowing from the interior chamber of the strainer through the ports 56 and 58 unseating valve 66 to provide a communication with passageway 32, ducts 26 and 28 and conduit 8 to a drain 16 which is in communication through the multi-port valve 12 with said conduit 8. The upward flow in part is accommodated by way of aperture 44 relatively restricted in nature, yet providing for the discharge of suspended particles of foreign substances retained by the water at the top of the tank and any accumulations of air at this point in the system.

The operation of the flow control device as described herein has certain attributes in that the strainer extending into and being in association with the free board space provides novel means which permits greatly increased flow of fluid through the bed 4 during the cleaning operation, thus vigorously agitating the particles thereof to dislodge the foreign substances and material attached thereto and the accumulated sediment disposed in the interstices between the same and to expand and rehabilitate the bed. The strainer is so constructed and arranged as hereinbefore described to permit of this expansion without loss of conditioning material. The flow rates adjacent the upper regions of the tank are considerably decreased because of the divergent or separated flow through the strainer, and at the level of the said valve 38 the rate is much less than at the said strainer but sufficient to effect discharge of the sediment laden water at that point through the aperture 44 into the flow circuit connected to drain 16 by way of passage 32, ducts 26 and 28, conduit 8 and multi-port valve 12. The device, in the construction of the said strainer and valve 38, embodies flow characteristics in that the slits of the strainer and the diameter of the aperture 44 are such that flow rates of the desired amount are regulated throughout the free board space 20 and at the level of said valve 38 to accommodate flow desired in regulated proportions whereby the decrease in the flow rate at the strainer permits proper expansion of the bed without loss of conditioning material, together with discharge of fluid, with regulated discharge of the sediment and foreign material laden fluid and any accumulations of air, etc. at the top part of the tank. In accordance with the design of the fluid control device of the present invention, all of the sediment, foreign material, fines, etc. which have accumulated within the bed 4 are discharged during the cleaning of the said bed whereby where is no gradual accumulation within the bed of such materials because of failure to completely dislodge and remove the same from the system.

In connection with the operation of the device during its "on" cycle, it should be noted that valve member 66 is in its closed position with respect of the strainer device, thus preventing, during this cycle of operation, discharge of raw fluid into the free board space through the strainer 52, the entire discharge being accommodated through port 34 of the said device. Because of this discharge of fluid through the port 34, the strainer is not subjected to this flow of fluid. This feature of construction is instrumental in keeping the strainer free from accumulations of foreign materials which, under most conditions, are carried in suspension by the incoming water or other fluids being treated, thus gradually clogging the strainer either wholly or in part, and not only affecting its efficiency during discharge of fluid into the tank, but also seriously handicapping the strainer in accommodating reverse flow which is instrumental in proper operation of the device in accordance with the present disclosure.

In the embodiment disclosed in Figure 1 of the drawings, the strainer is shown as being partially submerged in the upper region of the bed 4, but it is to be clearly understood that the efficacy of the strainer in the particular system is independent of its exact location with respect to the said bed and whether or not a free board space is provided in the tank.

After the bed has been rehabilitated as above described, it becomes necessary, where water conditioning is involved, to regenerate the bed of material 4. This is accomplished in the present apparatus by way of a regenerating solution which is injected through injector 76 into a flow system comprising communication between the raw water supply duct 14 and duct or conduit 8 effected by means of multi-port valve 12. This injected regenerating solution from tank 74 with the raw water enters the flow control device 22 and into the tank, passing downwardly through the bed, all in the same manner as would raw water being treated, and the same is discharged through conduit 10 to drain 16, this latter flow also being effected through valve 12.

After regeneration has proceeded to the desired extent, the injector is rendered inoperative and multi-port valve 12 is manipulated to introduce raw water through conduit 8 into the tank. The communication between drain conduit 16 and conduit 10 is maintained during the initial introduction of raw water after regenerating the bed 4 and until such time as tests show conditioned water, after which multi-port valve 12 may be again manipulated to discharge water through the conduit 18 to a point of use remote from the apparatus.

Figures 6, 7, 8, 9, 10:
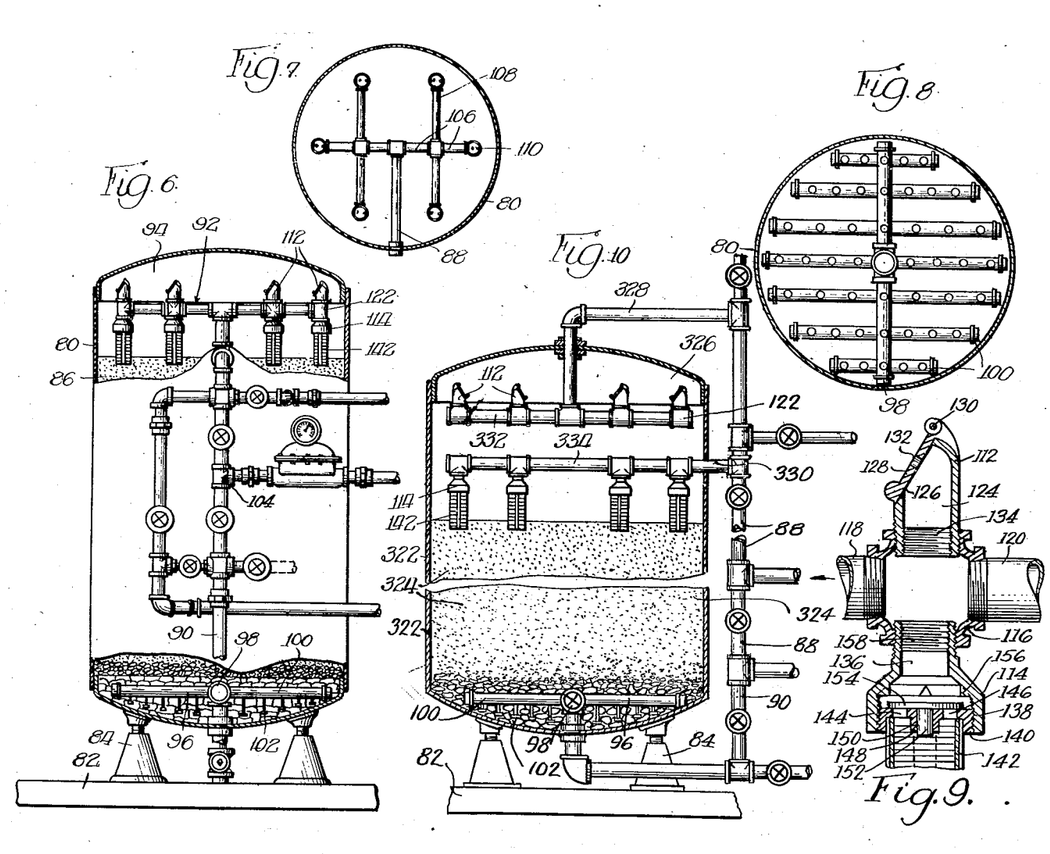
Figure 6 is a view in elevation of a fluid conditioning apparatus having parts broken away to disclose certain detailed constructions thereof, and more particularly showing an alternative form for a fluid control device made in accordance with the present invention.
Figure 7 is a view in cross section taken through the device of Figure 6 of the drawings and showing the arrangement of the fluid control device.
Figure 8 is a view in cross section taken through the apparatus of Figure 6 of the drawings, showing more in detail the construction and means providing for flow of fluid into and out of the apparatus.
Figure 9 is a fragmentary view partly in section and partly in elevation of a fluid control device as exemplified in Figure 6 of the drawings.
Figure 10 is a fragmentary view in cross section of a fluid conditioning apparatus showing a further alternative construction for a fluid control device made in accordance with the present invention.

Figures 6, 7 and 8 disclose an alternative construction for a fluid conditioning apparatus involving the general principles of operation of the apparatus shown in Figure 1 of the drawings and embodying to a large extent apparatus disclosed in the mechanism of Figure 1. The same includes a tank 80 mounted upon a support 82 through the pedestals 84 and which may contain a confined bed of material 86, as in the previously illustrated embodiment. Two-directional flow of fluid into and out of the tank is effected through conduits 88 and 90, the former communicating with the flow control device 92 mounted in the free board space 94 above the level of the bed 86 at the top of the tank, and the latter communicating with a fluid intake and discharge means 96 disposed within the tank adjacent the bottom thereof and being constituted by a manifold 98 with laterals 100 provided with a plurality of nozzles 102. In this regard, however, this device may take any form desired commensurate with the requirements for fluid flow at this point of the tank, and may or may not be in association with a gravel bed such as that shown in the previously described embodiment.

Two-directional flow in this device may be effected through mechanism generally referred to as 104 consisting of a plurality of valves and other mechanism which, in its more specific adaptation, can be used to effect the desired flow of fluid through the tank when the same is operated alone as a complete unit in itself, or in conjunction with one or more additional tanks constituting a battery which may be similarly operated or in any desired manner, either in conjunction with the disclosed apparatus or separately. As is usual in a device of this kind when used for conditioning water, a regenerating tank with injector means is used in association therewith for injecting the regenerating solution into the system in the manner applicable to the embodiment of Figure 1 of the drawings.

In the illustration herein depicted, the flow control device 92 embodies in its assembly a manifold 106 having a plurality of laterals 108 to which flow control units 110 are connected, it being understood that the said units may be connected to the laterals and/or manifold, or in any desired manner, to position the same in effective relation to the surface of the bed for purposes to be hereinafter described.

The flow control unit of this embodiment conforms substantially to the assembly as shown in Figure 9 of the drawings and comprises fittings 112 and 114 which may be provided with threads adapted to threadedly engage opposed openings of an intermediate fitting 116, which latter fitting further provides for the lateral connections in the form of ducts 118 and 120. In this respect, the detailed showing of Figure 9 varies from the unit assembly shown in Figure 6 of the drawings in that fitting 122 of the control device 92 merely has a single means for a lateral fitting conforming to either one of the ducts 118 or 120; otherwise the construction is substantially the same. Fitting 112 comprises a body formed with a longitudinal passage 124 terminating in a lateral port 126 defined by a seat in a plane angularly disposed in respect of the longitudinal axis of body 112 adapted to have seating relation with valve member 128 hinged as at 130 and apertured as at 132. It will be appreciated that this body 112 with its associated apertured valve member conforms substantially to a part of the flow control device of Figure 3 of the drawings, and the formation of the same in accordance with the present disclosure renders the same more flexible in its adaptation to various fittings necessary in certain installations of the kind herein contemplated. As a further feature of construction for this body 112, the interior bore or passageway 124 is threaded as at 134 to accommodate the same to a nipple or other fitting of a diameter less than the diameter of the opening of fitting 116, thereby further rendering this device applicable to various situations.

Fitting 114 is in substantial alignment with fitting 112 and is provided with passageway 136 flaring downwardly to provide a threaded opening 138 adapted to receive threaded valve member 140 which serves as a mounting for a strainer 142 secured thereto in any desired manner. This member 140 is provided with apertures 144 and 146 defined in part by spider 148 having an opening 150 therethrough adapted to receive the stem 152 of valve member 154 in the form of a plate adapted to seat with member 140 in overlapping relation to the ports 144 and 146. In order to limit movement of valve member 154 in relation to its seats, a plurality of shoulders 156 are provided at the transitional surface between the small and enlarged parts of passageway 136. It will be apparent from the description of member 114 that the same embodies features of construction of the lower part of the flow control device shown in Figure 3 of the drawings, thus adapting the principles of construction of the unit of Figure 3 to a multiplicity of situations involving the use of varying fittings for various installations. As a further feature adapting member 114 to a plurality of situations, the passageway 136 is threaded as at 158 whereby the said member can be secured to a nipple or similar fitting having an opening of less diameter than that of fitting 116 to which the member 114 is connected in the illustration.

In the installation shown in Figure 6 of the drawings, the members 112 and 114 are connected to fittings 122 to function in somewhat the same manner as the flow control unit of Figure 3 of the drawings. In the environment in which these units are disclosed, all of the improved results are accomplished as hereinbefore described in connection with the embodiment of Figure 1, it being further noted that in a large capacity device or apparatus of the type disclosed in Figure 6, it is highly essential that the flow at various portions of the bed, both into and out of the tank, and particularly when the flow is out of the tank through control device 92, be uniform to prevent channeling or bed blowing, which would otherwise gradually decrease the efficiency of the device during its normal cycle of operation involving the filtering or conditioning of water as illustrative of its use. The relatively restricted flow of fluid through the strainers and apertured valved members distributed throughout the free board space and proportioned to regulate the ratio of flow therethrough conforming to the requirements of the particular installation prevents damaging of the bed by way of channels or blows, yet provides for increased rates of flow without loss of material, all as previously described in detail in connection with the embodiment of Figure 1.

The construction for the fluid control device of Figure 9 of the drawings lends itself admirably to various installations, an additional construction being disclosed in Figure 10. In the installation represented by Figure 10, the apparatus comprises a tank 322 of relatively large capacity, confining therein a bed of fluid conditioning material 324 associated with fluid inlet and outlet means adjacent the bottom of the tank, such as shown in Figure 6, or any of the modifications expressly referred to in the above description of the apparatus of Figure 6. The fluid conditioning material 324 has its upper level in spaced relation to the top of the tank providing a free board space 326, in association with which is means providing for two-directional flow of fluid into and out of the tank, the same being constituted by branch lines 328 and 330 terminating in the manifold systems 332 and 334 disposed at different levels in the free board space 326. The former is provided with a plurality of fittings 112, and the latter is provided with a plurality of fittings 114 to which strainers 142 are connected, all of which fittings conform to the structure described in Figure 9 and operate in the same manner. Distribution of these fittings in respect of the manifolds 332 and 334 is such as to efficaciously accommodate all surface areas of the bed of material 324 to provide uniform flow and equitable distribution of fluid introduced into and being discharged from the tank for the purposes hereinabove enumerated.

In the specific embodiment of Figure 10, the arrangement of the said fittings 112 and 114 in their respective manifold systems is such that the apparatus is operated on the principle of a downflow fluid conditioning device, the fluid being conditioned in its downward passage through the bed 324 and the said bed being rejuvenated or rehabilitated by way of flow in the reverse direction.

Although the devices herein described are of the pressure type including an enclosed tank, it is to be understood that the invention is applicable in its various specific adaptations of the principles herein involved to pressure or gravity systems, whether the same embody in their installations closed or open tanks. Accordingly, "tank" as used throughout the specification and claims is to be understood as being definitive of any suitable container, whether closed or open, and used in conjunction with pressure or gravity type systems.

While I have herein described and upon the drawings shown illustrative embodiments of the invention, it is to be understood that the invention is not limited thereto but may comprehend other constructions, arrangements of parts, details and features without departing from the spirit of the invention.

I claim:

1. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, said fluid distributing and collecting means in the upper part of said tank comprising a device disposed in the upper part of said tank having restricted flow passages permitting flow of fluid therethrough and into said conduit means but preventing passage therethrough of conditioning material, and means communicating with the freeboard space above the level of said restricted flow passages and including an apertured check valve providing for relatively unrestricted fluid flow from said conduit means into the upper part of said tank and for relatively restricted fluid flow from the upper part of said tank into said conduit means.

2. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, said fluid distributing and collecting means in the upper part of said tank comprising a device disposed in the upper part of said tank having restricted flow passages permitting flow of fluid therethrough and into said conduit means but preventing passage therethrough of conditioning material, and means communicating with the freeboard space above the level of said restricted flow passages having a restricted flow opening providing a flow passage communicating with said conduit means for relatively restricted fluid flow from said tank into said conduit means, said last-mentioned means having a relatively unrestricted flow opening providing a flow passage communicating with the upper part of said tank for relatively unrestricted fluid flow from said conduit means into the upper part of said tank.

3. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, said fluid distributing and collecting means in the upper part of said tank comprising a device disposed in the upper part of said tank having restricted flow passages permitting flow of fluid therethrough and into said conduit means but preventing passage therethrough of conditioning material, and an automatic flow control device communicating with the freeboard space above the level of said restricted flow passages providing a restricted flow opening for relatively restricted fluid flow from the upper part of said tank into said conduit means and providing a relatively unrestricted flow opening for relatively unrestricted fluid flow from said conduit means into the upper part of said tank, said flow control device including a flow responsive valve to render one of the two flow openings operative selectively in response to the flow of fluid through said flow control device in a certain direction and to render the other of said openings operative upon reversal of the flow of fluid through said flow control device.

4. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, fluid distributing and collecting means in the upper part of said tank comprising a device disposed in the upper part of said tank having restricted flow passages permitting flow of fluid therethrough and into said conduit means but preventing passage therethrough of conditioning material, an automatic flow control device communicating with the freeboard space above the level of said restricted flow passages providing a restricted flow opening for relatively restricted fluid flow from the upper part of said tank into said conduit means and providing an unrestricted flow opening for relatively unrestricted fluid flow from said conduit means into the upper part of said tank, said flow control device including a flow responsive valve to render one of the two flow openings operative selectively in response to the flow of fluid through said flow control device in a certain direction and to render the other of said openings operative upon reversal of the flow of fluid through said flow control device, and valve means operable to close said conduit means to prevent flow of fluid into said tank through said restricted flow passages when fluid is being introduced into said tank through said unrestricted flow opening.

5. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, said fluid distributing and collecting means in the upper part of said tank comprising a device disposed in the upper part of said tank having restricted flow passages permitting fluid flow from said tank therethrough and into said conduit means but preventing passage therethrough of conditioning material, and a flow control device having a flow passage communicating with the freeboard space above the level of said restricted flow passages and including a check valve operatively associated with the aforesaid flow passage to move from one extreme position to another in response to reversal of fluid flow therethrough, said check valve permitting relatively restricted flow of fluid through the aforesaid passage from said tank from a level above said restricted flow passages into said conduit means, said check valve permitting relatively unrestricted flow of fluid through the aforesaid passage in the opposite direction from said conduit means into the upper part of said tank.

6. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, said fluid distributing and collecting means in the upper part of said tank comprising a strainer disposed in the upper part of said tank and having restricted flow passages permitting fluid flow from said tank therethrough and into said conduit means but preventing passage therethrough of conditioning material, and a flow control device adjacent the upper level of said strainer including a valve body having a relatively unrestricted opening for relatively unrestricted flow of fluid from said conduit means into the upper part of said tank, and a disk valve member movable relative to said valve body and adapted to gravitate to a position closing said unrestricted opening in said valve body, said disk valve member having a restricted opening therein to permit relatively restricted flow of fluid from said tank into said conduit means when said valve member is seated.

7. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, said fluid distributing and collecting means in the upper part of said tank comprising a strainer disposed in the upper part of said tank and having restricted flow passages permitting fluid flow from said tank therethrough and into said conduit means but preventing passage therethrough of conditioning material, a flow control device adjacent the upper level of said strainer including a valve body having a relatively unrestricted opening for relatively unrestricted flow of fluid from said conduit means into the upper part of said tank, and a disk valve member movable relative to said valve body and adapted to gravitate to a position closing said unrestricted opening in said valve body, said disk valve member having a restricted opening therein to permit relatively restricted flow of fluid from said tank into said conduit means when said valve member is seated, and check valve means operatively associated with the outlet of said strainer operable to permit fluid flow through said strainer from said tank to said conduit means but operable to prevent fluid flow from said conduit means to said tank through said strainer.

8. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, said fluid distributing and collecting means in the upper part of said tank including a strainer device disposed in the upper part of said tank having restricted flow passages permitting fluid flow from said tank therethrough and into said conduit means but preventing passage therethrough of conditioning material, and valve means arranged in one position to permit fluid flow through said strainer from said tank to said conduit means but adapted in another position to prevent fluid flow from said conduit means to said tank through said strainer.

9. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, said fluid distributing and collecting means in the upper part of said tank including a flow control device having a relatively unrestricted opening for relatively unrestricted fluid flow from said conduit means into the upper part of said tank and having a relatively restricted opening for relatively restricted fluid flow from the upper part of said tank into the said conduit means, said flow control device including a flow responsive valve to render one of the two openings operative selectively in response to the flow of fluid through said flow control device in a certain direction and to render the other of said openings operative upon reversal of the flow of fluid through said flow control device.

10. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, said fluid distributing and collecting means in the upper part of said tank comprising a device disposed in the upper part of said tank having restricted flow passages permitting flow of fluid therethrough and into said conduit means but preventing passage therethrough of conditioning material, said device having means spaced above the level of said restricted flow passages providing an opening for fluid flow from said conduit means into said tank, and check valve means disposed between said opening and said restricted flow passages operable by the fluid flowing into said tank to close said conduit means to prevent fluid flow into said tank through said restricted flow passages.

11. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, said fluid distributing and collecting means in the upper part of said tank comprising a strainer disposed in the upper part of said tank having restricted flow passages permitting fluid flow from said tank therethrough and into said conduit means but preventing passage therethrough of conditioning material, said device having means spaced above the level of said strainer providing an opening for fluid flow from said conduit means into said tank, check valve means disposed between the strainer and said opening operable by fluid flowing into said tank to close said conduit means to prevent fluid flow into said tank through said restricted flow passages, and other check valve means for restricting the outflow of water from the upper part of said tank through said opening, said last named check valve means being operable by fluid flowing out of said tank.

12. Fluid treatment apparatus comprising, in combination, a tank containing a bed of fluid conditioning material with a predetermined freeboard space left thereabove, a manifold in the freeboard space carrying flow control devices having a relatively unrestricted aperture for flow of fluid into said tank and a relatively restricted aperture for flow of fluid out of said tank, said manifold also carrying strainers having restricted flow passages permitting fluid flow from said tank therethrough but preventing passage therethrough of conditioning material, valve means associated with said strainers operable to prevent fluid flow into said tank through said strainers, conduit means communicating with said manifold and extending from the tank, fluid collecting and distributing means in the lower part of said tank, a second conduit means communicating with said fluid collecting and distributing means and extending from said tank, other conduits for conducting fluid from a source of supply to said tank through one of the aforesaid conduits, for conducting fluid from said tank to a point of use, and for conducting fluid from said tank to waste, and valve means for controlling the flow of fluid through said conduits.

13. In a fluid conditioning system, the combination of a container containing a predetermined bed of fluid conditioning material with a freeboard space left between the top of the conditioning material and the top of said container, a fluid distributing and collecting means in the lower part of said container, conduit means leading from said distributing and collecting means and extending from said container, fluid distributing and collecting means in the upper part of said container carrying nozzles and strainers having check valve control means operable by the fluid flowing into said container to supply the fluid conditioning system entirely through the nozzles and having apertured check valve control means operable by fluid flow out of said container to proportion said fluid flow through said strainers and nozzles in predetermined quantities while retaining the fluid conditioning material in the container, conduit means communicating with said last-named fluid collecting and distributing means and extending from said container, other conduits for conducting fluid from a source of supply to said container through one of said conduits, for conducting fluid from said container to a point of use, and for conducting fluid from said container to waste, and valve means for controlling the flow of said fluid.

14. Fluid treatment apparatus comprising, in combination, a container containing a bed of fluid conditioning material with a freeboard space provided between the top of said conditioning material and the top of said container, fluid distributing and collecting means in the upper part of said container carrying nozzles and strainers, control means for said nozzles providing relatively large openings for relatively unrestricted flow of fluid into said container and relatively small openings for relatively restricted flow of fluid out of said container, said strainers having restricted flow passages permitting fluid flow from said container therethrough but preventing passage therethrough of conditioning material, control means for said strainers operable to prevent fluid flow into said container through said strainers, conduit means communicating with said distributing and collecting means and extending from the container, fluid distributing and collecting means in the lower part of said container, a second conduit means communicating with said last-named fluid distributing and collecting means and extending from said container, other conduits for conducting fluid from a source of supply to said container through one of the aforesaid conduits, for conducting fluid from said container to a point of use, and for conducting fluid from said container to waste, and valve means for controlling the flow of fluid through said conduits.

15. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting the aforesaid two means with a source of fluid, to drain, and to a point of use, said fluid distributing and collecting means in the upper part of the tank having an opening for free fluid flow from said conduit means into said tank, a strainer device in the upper part of said tank below the elevation of the aforesaid opening and connected with the aforesaid conduit means and having restricted flow passages permitting flow of fluid therethrough into said conduit means but retaining the conditioning material against entrainment with such flow, the aforesaid opening being of appreciably less restriction than any of the flow passages of said strainer device, and there being a sufficient number of said flow passages in the strainer device to permit a predetermined outflow of water through the strainer device to the conduit means in relation to the outflow through the aforesaid opening, and check valve means between the strainer outlet and said conduit means to prevent fluid flow from said conduit means into said tank through the restricted flow passages of said strainer device.

16. Fluid treatment apparatus comprising, in combination, a tank containing a bed of fluid conditioning material with a predetermined freeboard space left thereabove, two manifolds one above the other in the freeboard space, the upper manifold carrying flow control devices having a relatively unrestricted aperture for flow of fluid into said tank and a relatively restricted aperture for flow of fluid out of said tank, valve means operative to permit flow through the unrestricted aperture or restricted aperture selectively, strainers on the lower manifold below the elevation of said apertures having restricted flow passages permitting fluid flow from said tank but retaining conditioning material, valve means associated with said strainers operable to prevent fluid flow into said tank through said strainers, a conduit with which said manifolds are separately in unrestricted communication, fluid collecting and distributing means in the lower part of said tank, a second conduit communicating with the latter fluid collecting and distributing means and extending from said tank, other conduits for conducting fluid from a source of supply to said tank through one of the aforesaid conduits, for conducting fluid from said tank to a point of use, and for conducting fluid from said tank to waste, and valve means for controlling the flow of fluid through said conduits.

17. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting the two aforesaid means with a source of fluid supply, to drain, and to a point of use, said upper fluid distributing and collecting means comprising a plurality of nozzles having relatively unrestricted apertures and a plurality of strainers having relatively restricted apertures, check valve means operatively associated with said nozzles and operated by fluid flowing out of said tank to said conduit means to restrict the outflow of fluid through said nozzles to said conduit means, said check valve means being movable to inoperative position by fluid flowing into said tank from said conduit means to permit relatively unrestricted inflow of fluid through said nozzles into said tank, and valve means in said conduit means to prevent flow of fluid from said conduit means through said strainers into said tank.

18. In a fluid conditioning system, the combination of a tank containing a bed of fluid conditioning material with a predetermined freeboard space left thereabove, a fluid distributing and collecting means in the lower part of said tank, a fluid distributing and collecting means in the upper part of said tank, conduit means connecting said means with a source of fluid, to drain, and to a point of use, said fluid distributing and collecting means in the upper part of said tank including a strainer device disposed in the upper part of said tank having restricted flow passages permitting fluid flow from said tank therethrough and into said conduit means but preventing passage therethrough of conditioning material, valve means arranged in one position to permit fluid flow through said strainer from said tank to said conduit means but adapted in another position to prevent fluid flow from said conduit means to said tank through said strainer, and means communicating with the freeboard space adjacent the upper level of said strainer device permitting inflow of fluid from said conduit means into the upper part of said tank independently of said strainer device.

CHESTER T. McGILL.